(12) United States Patent
Plonka

(10) Patent No.: US 6,483,477 B1
(45) Date of Patent: *Nov. 19, 2002

(54) RF RECEIVING ANTENNA SYSTEM

(75) Inventor: Robert J. Plonka, Quincy, IL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,923

(22) Filed: Feb. 2, 2000

Related U.S. Application Data

(63) Continuation-in-part of application No. 09/266,106, filed on Mar. 10, 1999.

(51) Int. Cl.[7] .................................................. H04B 1/10
(52) U.S. Cl. ....................................... 343/853; 343/820
(58) Field of Search ................................ 343/853, 820; 325/304; 375/102; 342/373, 154

(56) References Cited

U.S. PATENT DOCUMENTS

| | | | | |
|---|---|---|---|---|
| 4,914,676 A | * | 4/1990 | Iwamatsu et al. | 375/102 |
| 5,283,780 A | | 2/1994 | Shuchman et al. | 370/50 |
| 5,661,489 A | * | 8/1997 | Baker | 342/373 |

FOREIGN PATENT DOCUMENTS

| | | |
|---|---|---|
| EP | 0307950 A | 3/1989 |
| EP | 0416264 A | 3/1991 |
| EP | 1037306 A | 9/2000 |
| GB | 2011726 A | 7/1979 |

OTHER PUBLICATIONS

Copy of International Search Report.
Copy of European Search Report.

* cited by examiner

*Primary Examiner*—Don Wong
*Assistant Examiner*—James Clinger
(74) *Attorney, Agent, or Firm*—Tarolli, Sundheim, Covell, Tummino & Szabo L.L.P.

(57) ABSTRACT

An antenna system is provided for receiving horizontal and vertical components of a transmitted RF signal and for minimizing the magnitude of one of the components prior to application to an RF utilization means, such as a TV receiver. The system includes a vertical antenna for primarily receiving the vertical components of the RF signal. A horizontal antenna serves to primarily receive the horizontal components of the RF signal. An adjustable time delay serves to adjust the time delay between the vertical and horizontal components. A combiner combines the components to obtain therefrom a combined RF signal for application to the RF utilization means.

26 Claims, 3 Drawing Sheets

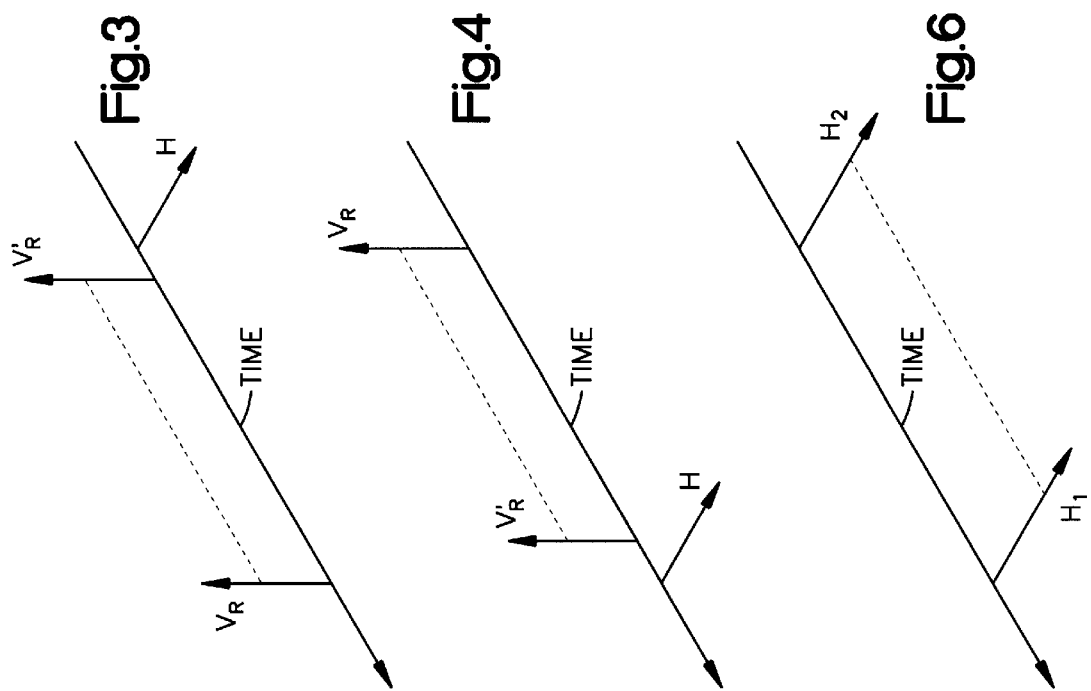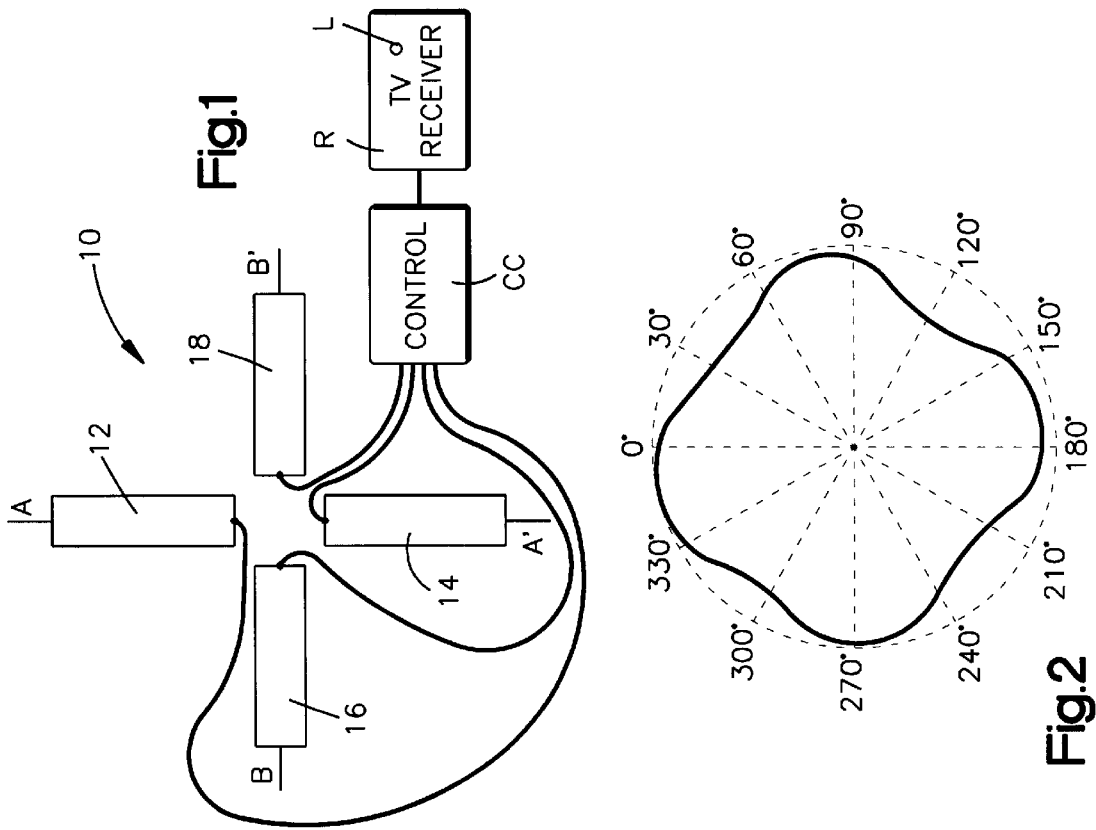

RF RECEIVING ANTENNA SYSTEM

RELATED APPLICATION

This is a continuation-in-part of my co-pending U.S. patent application Ser. No. 09/266,106 which was filed on Mar. 10, 1999.

BACKGROUND AND FIELD OF THE INVENTION

The present invention relates to antenna systems and, more particularly, to an antenna system particularly applicable for use in receiving RF signals including digital television (DTV) signals.

DESCRIPTION OF THE PRIOR ART

In the United States, the Federal Communications Commission (FCC) has established guidelines for broadcasting television signals. The established standard is known as the NTSC signal format which is an analog signal. The FCC is now permitting the broadcasting of digital television (DTV) as well as analog NTSC signals.

The digital television signals (DTV) being broadcast at this time are horizontally polarized signals. Circular polarized signals (CP) are being considered for future broadcasting of digital television signals. A problem noted with such horizontally polarized DTV signals arises in urban centers having tall buildings. The DTV signal may reflect off one or more buildings prior to being received at a subscriber's receiving antenna. If the receiving antenna is a "rabbit ear" di-pole antenna, the received signal may be comprised of the horizontal component (from the broadcasted horizontally polarized DTV signal) as well as a vertical component (the result of reflection). The reflected vertical component may lead or lag the horizontal component in time and be offset therefrom in phase, resulting in an erroneous "ghosting" signal being fed to the subscriber's DTV television receiver. The result will be a garbled picture on the television receiver.

It is understood that the same result will take place if the broadcasted signal is circularly polarized (CP). Such a signal, when received at a receiving antenna, will include a horizontal component and a vertical component together with a vertical reflection component and a horizontal reflection component resulting in erroneous signals being fed to the DTV television receiver.

SUMMARY OF THE INVENTION

In accordance with one aspect of the present invention, an antenna system is provided for receiving both horizontal and vertical components of a transmitted RF signal and for minimizing the magnitude of one of the components prior to application to an RF utilization means, such as a TV receiver.

The system includes a vertically oriented antenna for primarily receiving vertical components of the RF signal. A horizontally oriented antenna serves to primarily receive the horizontal components of the RF signal. An adjustable time delay adjuster circuit serves to adjust the time delay between the vertical and horizontal components. A combiner combines the components to obtain therefrom a combined RF signal for application to the RF utilization means.

BRIEF DESCRIPTION OF THE DRAWINGS

The foregoing and other objects and advantages of the present invention will become more readily apparent from the following as taken in conjunction with the accompanying drawings wherein:

FIG. 1 is an elevational view of a circular polarized antenna together with a block diagram illustration of accompanying circuitry;

FIG. 2 is an omni-directional radiation pattern illustrative of the type of signal that may be transmitted by a transmitting antenna and intended to be received by the receiving antenna of the system herein;

FIG. 3 is a vector diagram illustrating the received horizontal component of the RF signal together with a reflected vertical component which lags that of the horizontal component;

FIG. 4 is a vector diagram similar to that of FIG. 3 but wherein the reflected vertical component leads the horizontal component;

FIG. 6 is a vector diagram useful in describing the operation herein;

DESCRIPTION OF PREFERRED EMBODIMENT

Reference is now made to the drawings herein wherein the showings are for purposes of illustrating the preferred embodiments of the invention only and not for limiting same. FIG. 1 illustrates an antenna system in accordance with the invention wherein the antenna system includes a circular polarized antenna 10 having a pair of vertically oriented di-pole elements 12 and 14 and a pair of horizontally oriented di-pole elements 16 and 18. The antenna may be rotated about the vertical axis A–A' extending through elements 12 and 14, if desired. Also, the antenna may be rotated about the horizontal axis B–B' extending through the horizontal elements 16 and 18, if desired. This will be discussed in detail hereinafter. The RF signals received by the vertically oriented di-pole elements 12 and 14 are primarily the vertical components of the RF signal whereas the signals received by the horizontal di-pole elements 16 and 18 are primarily the horizontal components of the RF signal.

As will be brought out hereinafter, it is contemplated that the antenna 10 will be employed for receiving horizontally polarized signals which have been transmitted from a broadcasting antenna such as that which may be broadcasting digital television (DTV) signals. In an urban atmosphere, large buildings may interfere with the reception of such horizontally polarized signals because the signals may be reflected by various buildings resulting in the signals being received with horizontal components together with reflections which are received as vertical components. This may cause "ghosting", resulting in picture loss at the subscriber's TV receiver.

Figure 8:
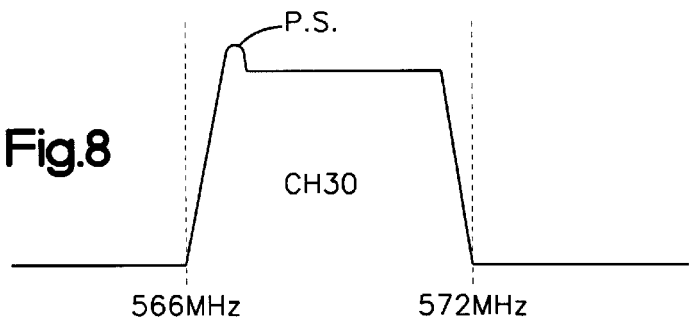
FIG. 8 is a graphical illustration of amplitude with respect to frequency and illustrating a waveform depicting the DTV channel 30 signal; and, FIG. 9 is an elevational view similar to FIG. 1 and showing means for rotating the antenna.

It is contemplated that the circular polarized antenna 10 be connected to a control circuit CC that minimizes the vertical components so that mostly the horizontal components of the horizontally polarized signal are supplied by the control circuit CC to a subscriber's TV receiver R. Such TV receivers will typically employ adaptive equalizers which are capable of correcting for some of the discrepancies, such as the vertical reflection components. However, minimizing the vertical reflection components will assure that such equalizers will provide a proper picture for the receiver R. It is contemplated that in addition to such an equalizer, the receiver is provided with a pilot light L which is illuminated whenever a pilot signal is detected. This can be accomplished by rotating the antenna 10 about either the axis A–A' or B–B' for tuning the receiver. Reference is made to FIG. 8 which shows a graphical waveform of the DTV signal for channel 30 which extends from 566 MHz to 572 MHz with the pilot signal PS being located at approximately 566.31 MHz.

FIG. 2 is illustrative of an omni-directional pattern which may be radiated by the broadcasting antenna. At present, this signal is contemplated as being a horizontally polarized signal. Consequently, any vertical component received at the receiving antenna 10 would be the result of reflections, such as from a tall building in an urban environment. If the transmitted signal takes the form of a circular polarized signal, the reflections may result in a vertical reflection component as well as a horizontal reflection component.

Reference is now made to FIG. 3 which is a vector diagram illustrating the horizontal component H of the received signal at the antenna system 10 in response to the broadcasting of a horizontally polarized signal. The vertical component is the result of a reflection between the transmitting antenna and the receiving antenna 10 as indicated by the vertical reflection component $V_R$. It is to be noted that this reflection component $V_R$ is spaced in time from the horizontal component H. In accordance with the present invention adjustments are made so that the vertical component is displaced in time to approximately the position of vertical component $V_R'$. The adjusted vertical component is still displaced in phase from that of the horizontal component H. Accordingly, in accordance with another aspect of the present invention, the adjusted component $V_R'$ is rotated toward the horizontal component as the components are combined so that there will result a useful, essentially horizontal component to be delivered to the receiver R.

FIG. 4 is similar to that of FIG. 3 but illustrates a second condition wherein the reflected vertical component $V_R$ is spaced in time from the horizontal component H. The control CC in accordance with the invention is employed for displacing the vertical component $V_R$ toward the location of component $V_R'$ and then this adjusted component $V_R'$ is rotated toward that of the component H.

Figure 5:
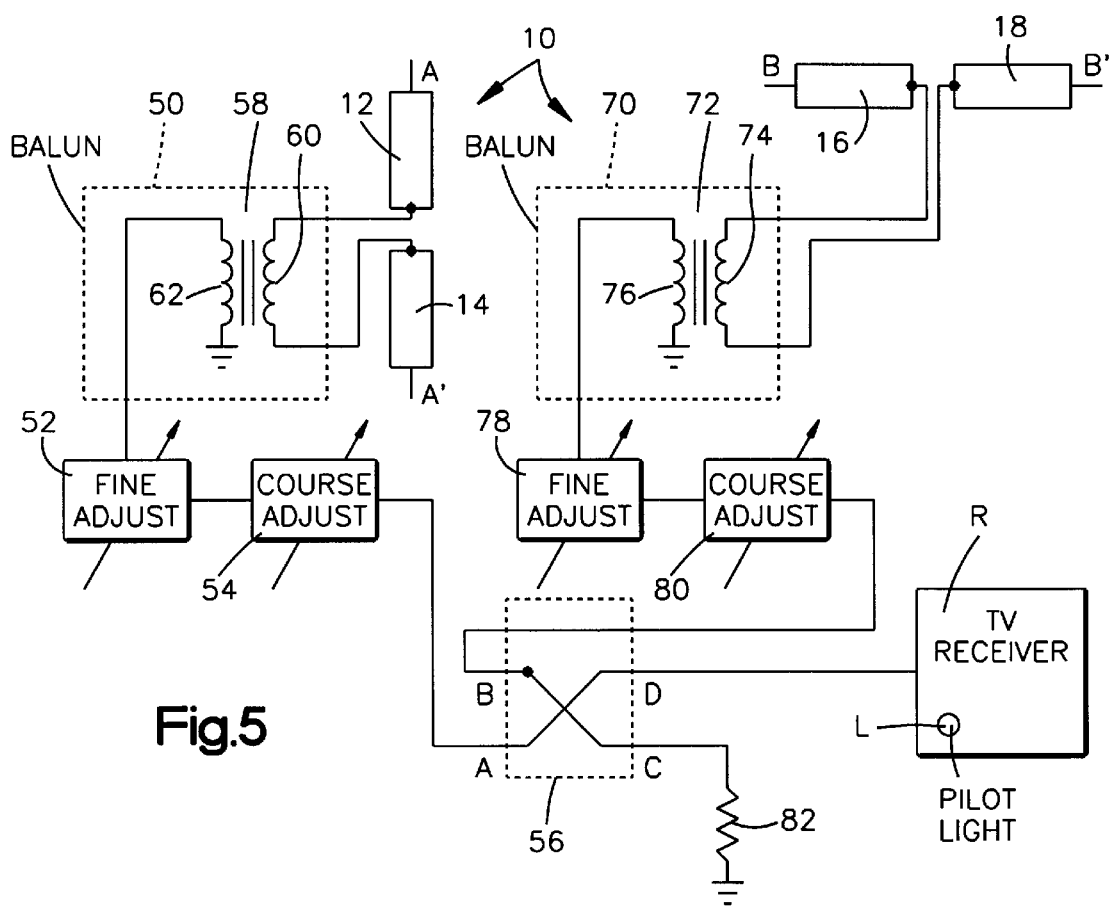
FIG. 5 is a schematic-block diagram illustration of one embodiment of the receiving system in accordance with the invention herein.

Reference is now directed to FIG. 5 which illustrates the control circuit CC in greater detail. Also, the vertical antenna elements 12, 14 and the horizontal antenna elements 16, 18 are illustrated as being spaced from each other for purposes of simplification. It is to be understood that the antenna elements are normally positioned as is illustrated in FIG. 1.

The vertical antenna elements 12 and 14 are connected by way of a balun 50 to an adjustment path including a fine delay adjuster 52 and a course delay adjuster 54 and thence to port A of a 90° hybrid combiner 56. The balun includes a transformer 58 having a primary winding 60 connected between antenna elements 12 and 14 and a secondary winding 62 connected between ground and the phase adjuster 52. The adjuster 52 and the adjuster 54 may be manually adjusted.

The horizontal di-pole elements 16 and 18 are also connected to a balun 70 which includes a transformer 72 having a primary winding 74 connected to elements 16 and 18 and secondary winding 76. The secondary winding 76 is connected between ground and an adjustment path including a fine delay adjuster 78 and a course delay adjuster 80. The adjuster 80 is connected to the B port of the hybrid 56. The phase and delay adjusters 78 and 80 may be manually adjusted. The C port of the hybrid combiner 56 is connected to a reject load 82 and the D port of the hybrid combiner is connected to the television receiver R.

It is contemplated that the user of the circuitry in FIG. 5 will adjust the fine delay adjusters 52 and 78 and the course delay adjusters 54 and 80 to achieve the results discussed hereinbefore with reference to FIGS. 3 and 4. That is, the delay adjusters are manipulated to move the reflected component $V_R$ toward that of component $V_R'$. During signal combining, the hybrid combiner 56 rotates component $V_R'$ toward that of the horizontal component H with the proper phase relationship, so that the output from port D is a single composite signal with the reflected component reduced in magnitude. The main vertical components and some 90 degree shifted and attenuated horizontal components are applied to the reject load 82.

In tuning the antenna system described herein it is contemplated that the operator may adjust the antenna somewhat by rotating it about it's axis A–A' or it's axis B–B' in addition to adjusting the delay adjusters 52, 54, 78 and 80. For example, in a first form of tuning, the operator may use three steps including adjusting the course delay, adjusting the antenna and then adjusting both the course delay and the antenna. A second form of tuning may involve three steps including adjusting the fine delay and then adjusting the antenna and thereafter adjusting both the fine delay and the antenna. A third method of tuning the system might include three steps of first adjusting the course delay and the fine delay, then adjusting the antenna, and finally adjusting the antenna and course delay and the fine delay. It is to be noted that the fine time delay or fine delay as described herein may be considered as phase delay. Also, the adjustments by the adjusters are made one increment at a time. Each increment by the fine adjusters is on the order of 12 nanoseconds while each increment by the course adjusters is 96 nanoseconds.

Reference is now made to the vector diagram of FIG. 6 which illustrates two horizontal components $H_1$ and $H_2$. No vertical reflection component is illustrated in this example. If the normal horizontal component is component $H_1$ then the reflected horizontal component may be considered $H_2$ In this case, the delay adjusters 52, 54, 78 and 80 are manipulated by the operator to move the components $H_1$ and $H_2$. The embodiment of the invention described herein is intended for use with digital television. Other time delays may be needed for various other digital applications.

The objective of the delay adjustments is to position the reflected components for cancellation in the hybrid reject load. In practice, only partial cancellation is needed to adjust the receiver adaptive equalization to an operative state.

Figure 7:
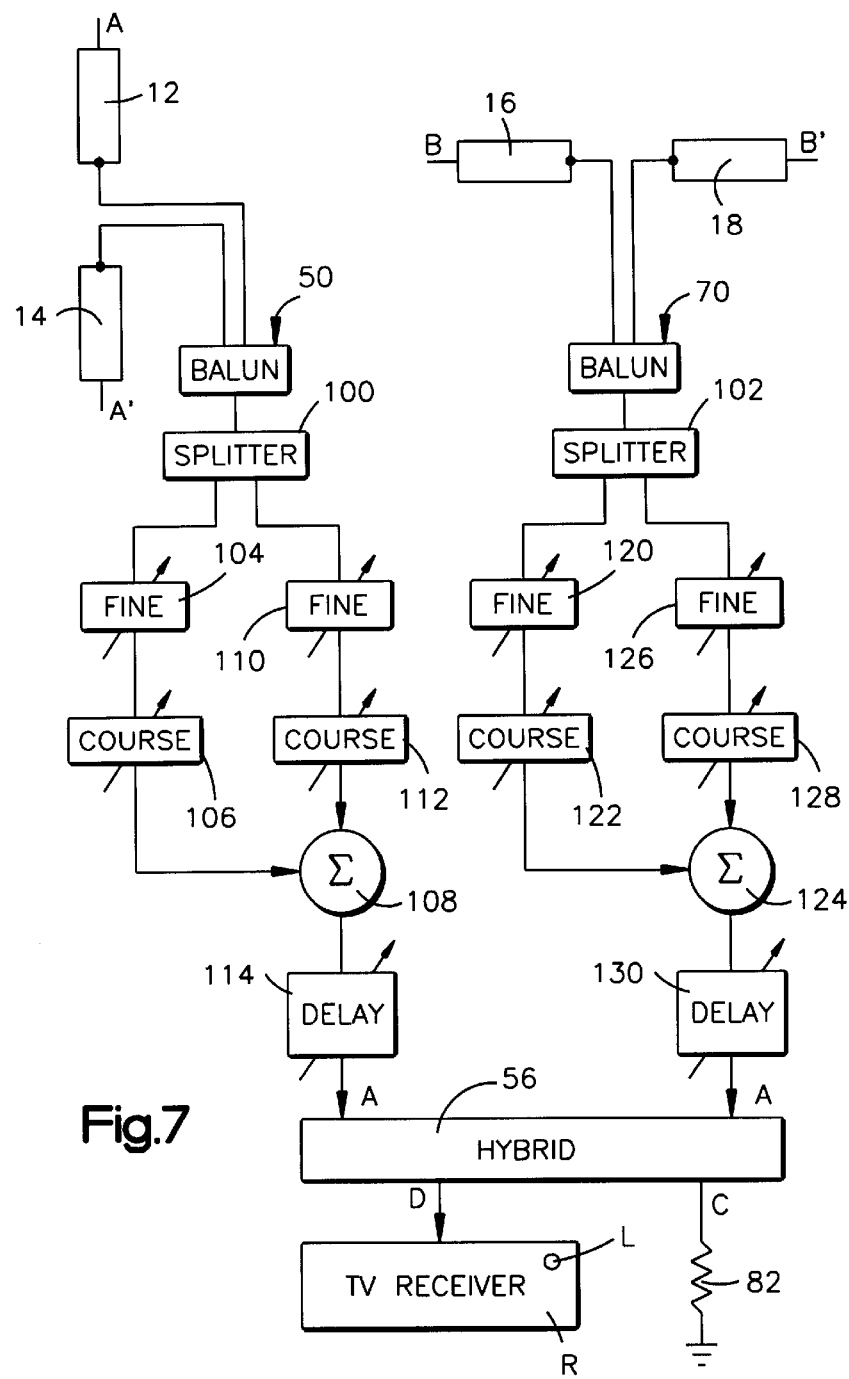
FIG. 7 is a combined schematic-block diagram illustration of a second embodiment of the invention herein.

Reference is now made to the embodiment illustrated in FIG. 7. This embodiment is particularly useful when correcting for several reflections of a broadcasted signal prior to the signal being received by the receiving antenna. This embodiment is similar to that of FIGS. 1 and 5 and like character references are employed in FIG. 7 when describing like components.

In this embodiment, the vertical antenna elements 12 and 14 are connected to a balun 50 and the horizontal antenna elements 16 and 18 are connected to a balun 70. However, unlike the embodiment of FIG. 5, the baluns 50 and 70 of FIG. 7 are respectively connected to signal splitters 100 and 102. These splitters each split the received signal into two paths representative of two reflections for which correction is to be accomplished. The two paths obtained from the splitter 100 include a first path having a fine delay adjuster 104 connected in series with a course delay adjuster 106 and thence to one input of a summation device 108. Similarly, the second path includes a fine delay adjuster 110 connected in series with a course delay adjuster 112 and thence to the summing device 108. The output of the summing device 108 is applied to a fine tune adjuster 114, the output of which is supplied to port A of the hybrid 56.

Splitter 102 supplies it's output signals to two paths with the first path including a fine delay adjuster 120 connected in series with a course delay adjuster 122 and thence to one input of a summation device 124. A second path from the splitter includes a fine delay adjuster 126 connected in series with a course delay adjuster 128 and thence to a second input of the summation device 124. The output of the summation device 124 is applied to a fine tune phase adjuster 130 the output of which is supplied to the B port of the hybrid 56.

The embodiment of FIG. 7 provides independent adjustment delay for each of the paths (or reflections) of the signals supplied to the antenna elements 12 and 14. In a similar manner, independent adjustment of delay is provided for each of the paths (or reflections) of the signals applied to the horizontal antenna elements 16 and 18. Additional tuning may be achieved with the fine tuning delay adjusters 114 and 130.

Figure 9:
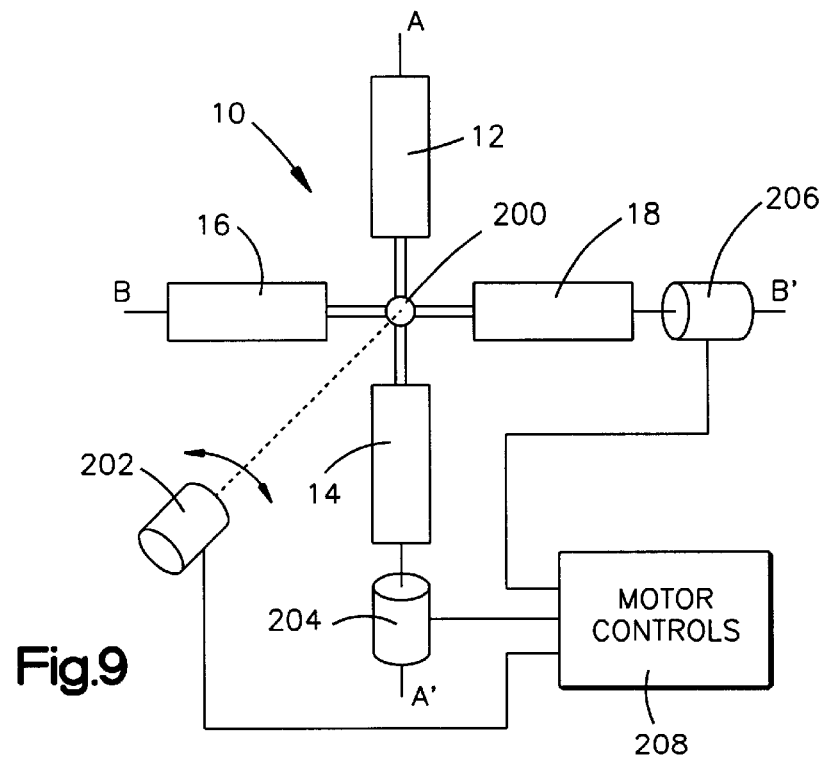

Reference is now made to FIG. 9 which illustrates means for achieving movement of the antenna 10 for rotation about axis A–A' or B–B' or for rotating the antenna about an axis perpendicular to the paper in either a clock-wise or counter-clock-wise direction about a hub 200. The hub is suitably connected to the antenna elements, as with non-conductive materials. The hub may be driven by a motor 202 whereas the vertical antenna elements 12 and 14 may be driven about axis A–A' by a suitable motor 204. Likewise, the horizontal antenna elements 16 and 18 may be driven about axis B–B' by means of a motor 206. It is contemplated that these motors may be individually controlled with suitable motor controls 208.

From the foregoing description of the invention, those skilled in the art will perceive improvements, changes and modifications. Such improvements, changes and modifications within the skill of the art are intended to be covered by the appended claims.

Having described the invention, I claim:

1. An antenna system for receiving horizontal and vertical components of a transmitted RF signal and for minimizing the magnitude of one of said components prior to application to an RF utilization means and comprising:
   vertical antenna means for primarily receiving said vertical components of said RF signal;
   horizontal antenna means for primarily receiving said horizontal components of said RF signal;
   time delay adjustment means for decreasing any time delay between said vertical and horizontal components; and
   a combiner for combining said components to obtain therefrom a combined RF signal for application to said RF utilization means.

2. A system as set forth in claim 1 wherein said combiner includes means for combining said components in such a manner to cause phase shifting of said vertical component toward said horizontal component.

3. A system as set forth in claim 2 wherein said combining means is a 90 degree hybrid combiner.

4. A system as set forth in claim 1 wherein said time delay means is adjustable.

5. A system as set forth in claim 1 wherein said combining means is a hybrid circuit.

6. A system as set forth in claim 5 wherein said combining means is a 90° hybrid circuit.

7. A system as set forth in claim 1 wherein said time delay adjustment means includes a vertical time delay adjuster coupled to said vertical antenna means and a horizontal time delay adjuster coupled to said horizontal antenna means.

8. An antenna system as set forth in claim 1 wherein said time delay adjustment means includes a vertical fine time delay adjuster coupled to said vertical antenna means and horizontal fine time delay adjuster coupled to said horizontal antenna means and wherein each said adjuster is incrementally adjusted such that each fine delay increment is a given increment of time.

9. An antenna system as set forth in claim 8 wherein said time delay adjustment means also includes a vertical course time delay adjuster coupled to said vertical antenna means and a horizontal course time delay adjuster coupled to said horizontal antenna means and wherein each said course delay adjuster is incrementally adjusted such that each course delay increment is substantially greater than each said fine delay increment.

10. A system as set forth in claim 9 wherein said vertical fine time delay adjuster and said vertical course time delay adjuster are connected together in series between said vertical antenna means and said combiner.

11. A system as set forth in claim 10 wherein said horizontal fine time delay adjuster and said horizontal course time delay adjuster are connected together in series between said horizontal antenna means and said combiner.

12. An antenna system for receiving horizontal and vertical components of a transmitted RF signal and for minimizing the magnitude of one of said components prior to application to an RF utilization means and comprising:
   vertical antenna means for primarily receiving said vertical components of said RF signal;
   horizontal antenna means for primarily receiving said horizontal components of said RF signal;
   time delay adjustment means for decreasing an time delay between said vertical and horizontal components;
   a combiner for combining said components to obtain therefrom a combined RF signal for application to said RF utilization means; and
   vertical signal splitter means coupled to said vertical antenna means for splitting any received RF signal into N correction paths and horizontal splitter means coupled to said horizontal antenna means for splitting any received RF signal into N correction paths wherein N represents the number of signal reflections being corrected.

13. A system as set forth in claim 12 wherein said time delay adjustment means includes a vertical time delay adjuster located in each of said N paths provided by said vertical splitter and a horizontal time delay adjuster located in each of said N paths provided by said horizontal splitter.

14. An antenna system for receiving horizontal and vertical components of a transmitted RF signal and for minimizing the magnitude of one of said components prior to application to an RF utilization means and comprising:
   a vertical antenna element that primarily receives said vertical components of said RF signal;
   a horizontal antenna element that primarily receives said horizontal components of said RF signal;

a time delay adjuster that decreases any time delay between said vertical and horizontal components; and a combiner that combines said components to obtain therefrom a combined RF signal for application to said RF utilization means.

15. A system as set forth in claim 14 wherein said combiner combines said components in such a manner to cause phase shifting of said vertical component toward said horizontal component.

16. A system as set forth in claim 15 wherein said combiner is a 90 degree hybrid combiner.

17. A system as set forth in claim 14 wherein said time delay adjuster is adjustable.

18. A system as set forth in claim 14 wherein said combiner is a hybrid circuit.

19. A system as set forth in claim 18 wherein said combiner is a 90° hybrid circuit.

20. A system as set forth in claim 14 wherein said time delay adjuster includes a vertical time delay adjuster coupled to said vertical antenna element and a horizontal time delay adjuster coupled to said horizontal antenna element.

21. An antenna system as set forth in claim 14 wherein said time delay adjuster includes a vertical fine time delay adjuster coupled to said vertical antenna element and a horizontal fine time delay adjuster coupled to said horizontal antenna element and wherein each said adjuster is incrementally adjusted such that each fine delay increment is a given increment of time.

22. An antenna system as set forth in claim 21 wherein said time delay adjuster also includes a vertical course time delay adjuster coupled to said vertical antenna element and a horizontal course time delay adjuster coupled to said horizontal antenna element and wherein each said course delay adjuster is incrementally adjusted such that each course delay increment is substantially greater than each said fine delay increment.

23. A system as set forth in claim 22 wherein said vertical fine time delay adjuster and aid vertical course time delay adjuster are connected together in series between said vertical antenna element and said combiner.

24. A system as set forth in claim 23 wherein said horizontal fine time delay adjuster and said horizontal course time delay adjuster are connected together in series between said horizontal antenna element and said combiner.

25. An antenna system as set forth in claim 14 including a vertical splitter coupled to said vertical antenna element for splitting any received RF signal into N correction paths and a horizontal signal splitter coupled to said horizontal antenna element for splitting any received RF signal into N correction paths wherein N represents the number of signal reflections being corrected.

26. A system as set forth in claim 25 wherein said time delay adjuster includes a vertical time delay adjuster located in each of said N paths provided by said vertical splitter and a horizontal time delay adjuster located in each of said N paths provided by said horizontal splitter.

* * * * *